United States Patent
Nishino et al.

(10) Patent No.: US 10,487,229 B2
(45) Date of Patent: Nov. 26, 2019

(54) INK JET RECORDING METHOD AND INK JET RECORDING APPARATUS

(71) Applicant: CANON KABUSHIKI KAISHA, Tokyo (JP)

(72) Inventors: Yuki Nishino, Inagi (JP); Kenji Moribe, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/912,925

(22) Filed: Mar. 6, 2018

(65) Prior Publication Data
US 2018/0258301 A1 Sep. 13, 2018

(30) Foreign Application Priority Data

Mar. 10, 2017 (JP) .................. 2017-045716

(51) Int. Cl.
*B41J 2/21* (2006.01)
*B41M 5/00* (2006.01)
(Continued)

(52) U.S. Cl.
CPC ........... *C09D 11/326* (2013.01); *B41J 2/2107* (2013.01); *B41M 5/0011* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00;
(Continued)

(56) References Cited

U.S. PATENT DOCUMENTS 8,857,967 B2    10/2014   Saito et al.
9,586,398 B2    3/2017    Kato et al.
(Continued)

FOREIGN PATENT DOCUMENTS

| JP | 2008-222946 A | | 9/2008 | |
|---|---|---|---|---|
| JP | 2008222946 A | * | 9/2008 | ............... B41J 2/01 |
| JP | 2016-175302 A | | 10/2016 | |

*Primary Examiner* — Manish S Shah
(74) *Attorney, Agent, or Firm* — Venable LLP (57) ABSTRACT

Provided is an ink jet recording method capable of recording an image excellent in color developability while suppressing ink deposition. The ink jet recording method includes ejecting an aqueous ink from an ejection orifice of a recording head based on image data to record an image on a recording medium and ejecting the heated ink to an ink receiving member from the ejection orifice based on preliminary ejection data. The aqueous ink contains a pigment and a resin dispersant for dispersing the pigment and satisfies at least one of requirement (1): the resin dispersant is a water-soluble acrylic resin having an acid value of 135 mgKOH/g or less and requirement (2): the aqueous ink further contains a water-soluble acrylic resin having an acid value of 135 mgKOH/g or less. The pigment is carbon black whose cumulative 50% particle size in volume-based particle size distribution is 80 nm or less.

19 Claims, 2 Drawing Sheets

(51) Int. Cl.
  *B41J 2/01*    (2006.01)
  *C09D 11/326*  (2014.01)
  *C09D 11/037*  (2014.01)
  *C09D 11/033*  (2014.01)
  *C09D 11/102*  (2014.01)
  *C09D 11/107*  (2014.01)
  *C09D 11/324*  (2014.01)

(52) U.S. Cl.
  CPC .......... *C09D 11/033* (2013.01); *C09D 11/037* (2013.01); *C09D 11/102* (2013.01); *C09D 11/107* (2013.01); *C09D 11/324* (2013.01); *B41J 2/01* (2013.01); *B41M 5/0023* (2013.01)

(58) Field of Classification Search
  CPC .... B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218

See application file for complete search history.

(56) References Cited

U.S. PATENT DOCUMENTS

| | | | | |
|---|---|---|---|---|
| 2003/0166742 | A1* | 9/2003 | Hirasa | C09D 11/322 523/160 |
| 2007/0225400 | A1* | 9/2007 | Schmid | C09D 11/30 523/160 |
| 2008/0108746 | A1* | 5/2008 | Waki | C09D 11/40 524/590 |
| 2009/0170986 | A1* | 7/2009 | Brust | C09D 11/326 524/104 |
| 2013/0065028 | A1* | 3/2013 | Fujii | C09D 11/322 347/20 |
| 2016/0271942 | A1 | 9/2016 | Kato et al. | |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In recent years, there has been an increasing demand for an ink (pigment ink) containing a pigment as a coloring material and having the advantage that it can record an image excellent in water resistance, light resistance and gas resistance in an ink jet recording method. The pigment ink has, however, the drawback that compared with an ink (dye ink) containing a dye as a coloring material, it has a difficulty in recording an image excellent in color developability on a recording medium such as glossy paper. With a view to overcoming such a drawback and recording an image excellent in color developability, there has been proposed, for example, an ink jet recording ink using a resin dispersed pigment obtained by dispersing a particle-size-reduced pigment with a resin dispersant (Japanese Patent Application Laid-Open No. 2008-222946).

In an ink jet recording method, an ink is ejected to a recording medium from an ejection orifice of a recording head and an image is thus recorded. Clogging of the ejection orifice with the ink or the like or thickening of the ink in a flow path due to evaporation of its liquid component sometimes makes difficult normal ejection of the ink. There is therefore proposed an ink jet recording apparatus that performs an operation of ejecting an ink to an ink receiving member (preliminary ejection operation) after an elapse of a predetermined time after the ink is ejected last (Japanese Patent Application Laid-Open No. 2016-175302).

SUMMARY OF THE INVENTION

The present inventors have investigated recording of an image on a recording medium such as glossy paper with an ink containing a resin dispersed pigment proposed in Japanese Laid-Open Patent Publication No. 2008-222946 while carrying out a preliminary ejection operation. As a result, it has been found that this makes it possible to record an image exhibiting good color developability. It has been revealed, however, that there occurs another drawback that the ink ejected by the preliminary ejection operation is deposited on an ink receiving member (hereinafter, also referred to as "ink deposition") and the resulting ink deposit adheres to a recording head, thereby making normal ink ejection difficult.

An object of the present invention is therefore to provide an ink jet recording method capable of recording an image excellent in color developability while suppressing ink deposition. Another object of the present invention is to provide an ink jet recording apparatus to be used for the above-described ink jet recording method.

The above-described object is achieved by the present invention described below. In the present invention, there is thus provided an ink jet recording method including a recording step of ejecting an aqueous ink from an ejection orifice of a recording head based on image data and recording an image on a recording medium; and a preliminary ejection step of heating the aqueous ink and ejecting the heated aqueous ink to an ink receiving member from the ejection orifice based on preliminary ejection data. In this method, the aqueous ink contains a pigment and a resin dispersant for dispersing the pigment and satisfies at least one of the following requirements (1) and (2):

Requirement (1): the resin dispersant is a water-soluble acrylic resin having an acid value of 135 mgKOH/g or less;

Requirement (2): the aqueous ink further contains a water-soluble acrylic resin having an acid value of 135 mgKOH/g or less; and the pigment is carbon black whose cumulative 50% particle diameter in volume-based particle size distribution is 80 nm or less.

The present invention can provide an ink jet recording method capable of recording an image excellent in color developability while suppressing ink deposition. The present invention can also provide an ink jet recording apparatus to be used for the above ink jet recording method.

Further features of the present invention will become apparent from the following description of exemplary embodiments with reference to the attached drawings.

BRIEF DESCRIPTION OF THE DRAWINGS

FIGS. 1A and 1B are views schematically showing one embodiment of the ink jet recording apparatus of the present invention, in which FIG. 1A is a perspective view and FIG. 1B is a plan view.

DESCRIPTION OF THE EMBODIMENTS

The invention will hereinafter be described in further detail with reference to preferred embodiments. When a compound in an ink is a salt, the salt is present while being dissociated into ions in the ink. In the present invention, it is expressed "ink contains a salt" for convenience sake. An aqueous ink for ink jet is sometimes called "ink" simply. Further, carbon black is sometimes called "pigment", simply. The physical property values are values at normal temperature (25° C.) unless otherwise particularly specified.

An image excellent in color developability can be recorded by using an aqueous ink containing a pigment (carbon black) whose cumulative 50% particle diameter in volume-based particle size distribution is 80 nm or less and a resin dispersant for dispersing the pigment. Investigation by the present inventors, however, has revealed that when an image is recorded with the above-described aqueous ink while carrying out a preliminary ejection operation, the ink is deposited on an ink receiving member and an ink deposit adheres to a recording head. The ink deposit adhered to the recording head makes it difficult to sufficiently improve the ejection properties of the ink even if preliminary ejection is performed. As a result of further investigation, the present inventors have found that ink deposition can be suppressed and degradation in the ejection properties of the ink can be suppressed by using an aqueous ink having the constitution as described below and carrying out a step of heating the ink and preliminarily ejecting the heated ink to an ink receiving member.

[Aqueous ink]: An ink that contains a pigment (carbon black) whose cumulative 50% particle diameter in volume-based particle size distribution is 80 nm or less and a resin dispersant for dispersing the pigment and satisfies at least one of the following requirements (1) and (2):

Requirement (1): the resin dispersant is a water-soluble acrylic resin having an acid value of 135 mgKOH/g or less.

Requirement (2): the aqueous ink further contains a water-soluble acrylic resin having an acid value of 135 mgKOH/g or less.

The present inventors presume that the above-described advantages can be obtained because of the following reasons. Suppose that, in an ink containing a pigment (carbon black) in a state dispersed by a resin dispersant, the particle size of the pigment is changed without changing a pigment: (resin dispersant) ratio. In the case of a large-particle-size pigment, the total surface area of the pigment in the ink is relatively small, while in the case of a small-particle-size pigment, the total surface area of pigment particles in the ink becomes large because the pigment has a small particle size. When the small-particle-size pigment is used, the surface area of the pigment to which the resin dispersant has not been adsorbed is likely to increase due to the shortage of the resin dispersant. The pigment in the ink ejected to the ink receiving member by preliminary ejection is likely to have an unstable dispersion state after evaporation of its water content and this may lead to ink deposition. When the adsorptivity of the resin dispersant to the surface of the pigment particles is weak, the resin dispersant is easily desorbed from the surface of the pigment particles after evaporation of the water content in the ink ejected to the ink receiving member by preliminary ejection so that ink deposition is likely to occur.

On the other hand, when a water-soluble acrylic resin having an acid value as low as 135 mgKOH/g or less is contained in the ink, the adsorptivity of the water-soluble acrylic resin to the surface of the pigment particles increases. Even if the water content evaporates, the water-soluble acrylic resin is not easily desorbed from the surface of the pigment particles, thereby preventing the dispersion state of the pigment from becoming unstable. Further, preliminary ejection of the heated ink can further enhance the adsorptivity of the water-soluble acrylic resin to the surface of the pigment particles. Since the desorption of the water-soluble acrylic resin from the pigment is suppressed, even if the pigment aggregates once after evaporation of the water content, the aggregated pigment can be disaggregated easily by a preliminarily ejected ink which will be ejected next continuously. It is presumed that the ink deposition can be suppressed in such a manner.

<Ink Jet Recording Method and Ink Jet Recording Apparatus>

The ink jet recording method of the present invention has a recording step of ejecting an aqueous ink from an ejection orifice of a recording head based on image data and recording an image on a recording medium and a preliminary ejection step of heating the aqueous ink and ejecting the heated ink to an ink receiving member from the ejection orifice based on preliminary ejection data. The ink jet recording apparatus of the present invention is equipped with an aqueous ink, a recording head filled with the aqueous ink and recording an image on a recording medium by ejecting the aqueous ink from an ejection orifice based on image data, and a preliminary ejection mechanism. This preliminary ejection mechanism is a mechanism of heating the aqueous ink and ejecting the heated ink to an ink receiving member from the ejection orifice based on preliminary ejection data.

Figure 1A:
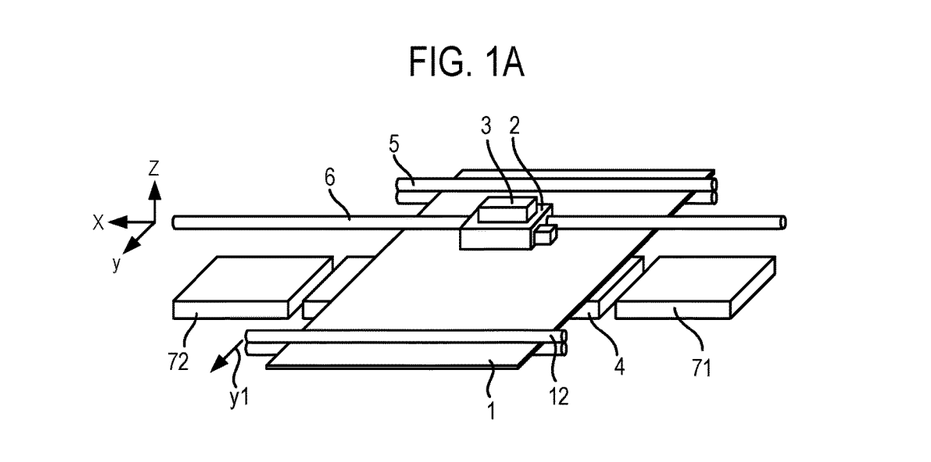
Figure 1B:
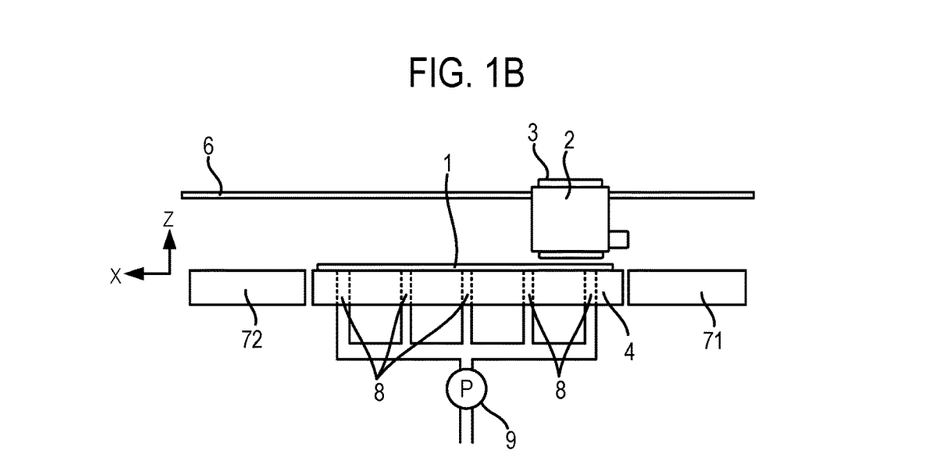

FIGS. 1A and 1B are views schematically showing one embodiment of the ink jet recording apparatus of the present invention, in which FIG. 1A is a perspective view and FIG. 1B is a plan view. As shown in FIG. 1A, the ink jet recording apparatus of the present embodiment is equipped with a recording medium 1, a carriage 2, a recording head 3, a platen 4, a conveying roller 5, a guide shaft 6, a paper discharge roller 12 and ink receiving members 71 and 72. At a position facing to the ejection orifice surface of the recording head 3, the platen 4 which is a support member is provided over the travelling region of the recording head 3. With the recording medium 1 being supported by the platen 4, recording operation is performed. Examples of an ink ejection method include a method of applying dynamic energy to an ink and a method of applying thermal energy to an ink.

The recording medium 1 is conveyed in the direction y1 that crosses the direction x by a conveyance units including the conveying roller 5 or paper discharge roller 12. The conveying roller 5 is provided on the side upstream of the platen 4 in the conveyance direction of the recording medium 1. The paper discharge roller 12 is provided on the side downstream of the platen 4 in the conveyance direction of the recording medium 1.

The recording head 3 is mounted detachably on the carriage 2. The carriage 2 reciprocates along the direction x. More specifically, the carriage 2 is supported movably along the guide shaft 6 placed along the direction x and is fixed to an endless belt (not shown) that travels parallel to the guide shaft 6. The endless belt is reciprocated by the drive force of a carriage motor (CR motor), by which the carriage 2 is reciprocated in the direction x. By repeating such conveying operation of the recording medium 1 by the conveying unit and recording operation performed based on image data while moving the record head 3 mounted on the carriage 2 in a direction crossing the conveying direction of the recording medium 1, an image is recorded on the recording medium 1.

In the ink jet recording apparatus of the present embodiment, when there occurs a necessity to remove an ink thickened as a result of evaporation of the water content from the ejection orifice of the recording head 3 or remove air bubbles in the ejection orifice and thereby recover the state of the ejection orifice, preliminary ejection operation is performed. The preliminary ejection operation is performed to eject, from the ejection orifice, the ink not used for recording in a predetermined timing based on preliminary ejection data. The ink receiving members 71, 72 provided outside the recording region are used for receiving the ink ejected at the time of such preliminary ejection. A recovery treatment apparatus (not shown) may be provided in order to recover and keep the ink ejection state of the recording head 3.

As shown in FIG. 1B, the platen 4 is provided with a plurality of suction ports 8 connected to a common suction pump 9. The recording medium 1 can be adsorbed to the platen 4 by sucking it with a suction pump 9. The ink applying position can be controlled precisely by carrying out recording operation with the recording medium 1 being adsorbed to the platen 4. The recording medium 1 may be brought into close contact with the platen 4 by pressing the recording medium 1 against a pressing member from a direction opposite to the platen 4. Alternatively, the recording medium 1 may not be brought into close contact with the platen 4.

(Preliminary Ejection Step)

Figure 2:
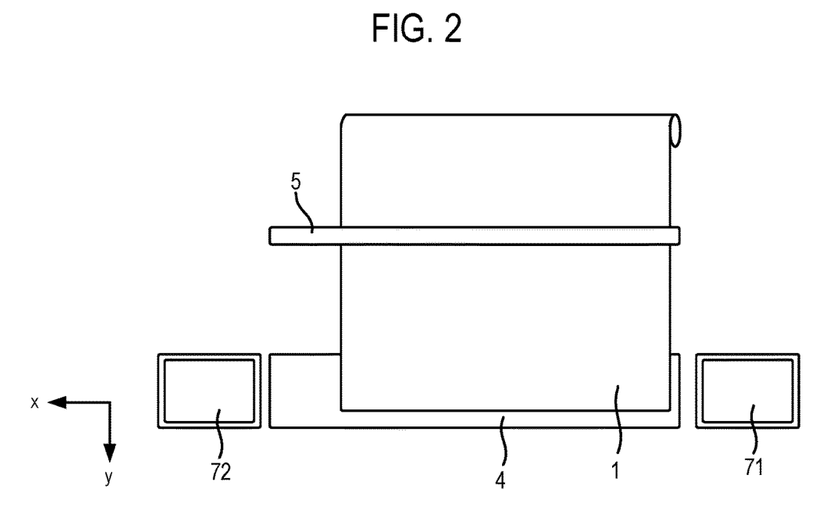
FIG. 2 is a top view schematically showing one embodiment of the ink jet recording apparatus of the present invention.

FIG. 2 is a top view schematically showing one embodiment of the ink jet recording apparatus of the present invention. As shown in FIG. 2, the ink receiving members 71, 72 are provided outside the recording region where recording operation on the recording medium 1 is performed. The ink receiving members 71 and 72 may be provided on the platen 4 if it is placed outside the recording region. The recording medium may be not only a rolled recording medium 1 as shown in FIG. 2 but also cut paper. It is also preferred to use a recording medium (glossy paper or the like) having a coat layer in order to record an image with gloss.

In the ink jet recording apparatus of the present embodiment, degradation in ejection properties due to thickening of an ink in the ejection orifice is suppressed by ejecting the ink to the ink receiving members 71, 72 by the preliminary ejection operation in each scanning timing. The number of times of preliminary ejection which is ejected by preliminary ejection operation may be controlled depending on the conditions such as ejection idle period, scanning-direction size of an image to be recorded or a recording medium or a recording environment. This means that during the recording operation, the number of times of preliminary ejection may be controlled to be fixed, regardless of the position of the recording medium in the conveying direction. When the recording apparatus is used again after disuse for a while, on the other hand, preliminary ejection operation is performed also before the recording operation is started.

For heating the ink in the preliminary ejection step, there are, for example, a method of bringing a temperature control heater into contact with a recording head to control its temperature and a method of repeatedly applying, to a heater for ink ejection, a current small enough not to eject the ink and thereby controlling the temperature of the recording head. As the method of heating the ink, a method of adjusting the temperature of the recording head by making use of the heater for ink ejection is preferred. In this case, it is only necessary to install, in a liquid chamber corresponding to one ejection orifice of the recording head, a heater used both for ink ejection and for heating. A plurality of heaters are not required. In the present invention, heating is preferably controlled so as to adjust the temperature of the ink ejected based on preliminary ejection data to 40° C. or more to 70° C. or less.

(Ink)

In the ink jet recording method of the invention, an ink containing a pigment and a resin dispersant for dispersing the pigment is used. Components constituting the ink and the like will hereinafter be described.

[Pigment]

The pigment to be used in the ink is carbon black. As carbon black, any of conventionally known carbon black such as furnace black, acetylene black, lamp black and gas black can be used. The BET specific surface area of carbon black is preferably 210 $m^2/g$ or less. The pigment (carbon black) having a BET specific surface area more than 210 $m^2/g$ may slightly degrade the ink deposition suppressing effect. The BET surface area of carbon black is preferably 100 $m^2/g$ or more, more preferably 150 $m^2/g$ or more, particularly preferably 155 $m^2/g$ or more. The content (% by mass) of the pigment in the ink is preferably 1.0% by mass or more to 10.0% by mass or less based on the total mass of the ink.

The cumulative 50% particle diameter in volume-based particle size distribution (hereinafter referred to "D50") is 80 nm or less. When the D50 of the pigment is more than 80 nm, an image excellent in color developability cannot be recorded because light scattering of a pigment layer thus formed easily increases. The D50 of the pigment can be measured using a dynamic light scattering-system particle size distribution analyzer (for example, trade name: "UPA-EX150", product of NIKKISO). The D50 of the pigment is preferably 40 nm or more, more preferably 55 nm or more.

[Resin Dispersant]

The pigment is required to be a resin-dispersed pigment obtained by dispersing in an ink with a resin dispersant. Use of a self-dispersible pigment instead of a resin dispersant may cause ink deposition because the dispersion state of the pigment in a preliminarily ejected ink becomes unstable easily after evaporation of the water content. Examples of the resin dispersed pigment include a pigment dispersed in an ink while having a resin dispersant physically adsorbed to the surface of the pigment particles and a microcapsule pigment obtained by covering, with a resin, at least a portion of the surface of the pigment particles.

The resin dispersant may have any structure insofar as it can be used for an aqueous ink. Examples of the resin used as the resin dispersant include acrylic resins, polyamide resins, polyester resins, polyvinyl alcohol resins and polyolefin resins. These resins are preferably water-soluble resins having an acid group. The term "water-soluble resin" as used herein means a resin which does not form particles whose particle size can be measured by a dynamic light scattering method when it is neutralized with an alkali in an amount corresponding to the acid value.

As the resin dispersant, an acrylic resin having, as a constitution unit thereof, a hydrophilic unit and a hydrophobic unit is preferred. The term "meth(acrylic)" as used herein means acrylic or methacrylic and the term "(meth)acrylate" means an acrylate or methacrylate.

The hydrophilic unit is formed by polymerizing a monomer having a hydrophilic group such as acid group or hydroxy group. Examples of the monomer having a hydrophilic group include acid monomers having a carboxylic acid group such as (meth)acrylic acid, itaconic acid, maleic acid, or fumaric acid; acid monomers having a phosphonic acid group such as ethyl (meth)acrylate-2-phosphonate; anionic monomers such as anhydrides or salts of these acid monomers; monomers having a hydroxy group such as 2-hydroxyethyl (meth)acrylate and 3-hydroxypropyl (meth)acrylate; and monomers having an ethylene oxide group such as methoxy (mono, di, tri, or poly)ethylene glycol (meth)acrylate. Examples of the cation constituting the salt of the anionic monomer include a lithium ion, a sodium ion, a potassium ion, an ammonium ion and organic ammonium ions.

The hydrophobic unit is formed by polymerizing a hydrophobic monomer, that is, a monomer not having a hydrophilic group such as acid group or hydroxy group. Examples of the hydrophobic monomer include monomers having an aromatic ring such as styrene, α-methylstyrene and benzyl (meth)acrylate; and monomers having an aliphatic group, such as ethyl (meth)acrylate, methyl (meth)acrylate, (iso) propyl (meth)acrylate, (n-, iso-, or t-)butyl (meth)acrylate and 2-ethylhexyl (meth)acrylate. The acrylic resin may be any of a random copolymer, a block copolymer and a graft copolymer.

[Water-Soluble Acrylic Resin]

The ink to be used in the ink jet recording method of the invention satisfies at least one of the following requirements (1) and (2). A water-soluble acrylic resin having an acid value of 135 mgKOH/g or less may be used as a "resin dispersant" for dispersing the above-described pigment or as an "additive resin" to be incorporated in the ink as well as the resin dispersant.

Requirement (1): the resin dispersant is a water-soluble acrylic resin having an acid value of 135 mgKOH/g or less.

Requirement (2): the ink further contains a water-soluble acrylic resin having an acid value of 135 mgKOH/g or less.

When the water-soluble acrylic resin has an acid value more than 135 mgKOH/g, its adsorptivity to the pigment is too small. Ink deposition is likely to occur because the dispersion state of the pigment in the ink preliminarily ejected to an ink receiving member becomes unstable due to evaporation of the water content. The acid value of the water-soluble acrylic resin is preferably 80 mgKOH/g or more, more preferably 100 mgKOH/g or more and is also preferably 130 mgKOH/g or less.

As the water-soluble acrylic resin, a resin comprised of units selected as needed from those exemplified above as the resin dispersant can be used. The water-soluble acrylic resin preferably has a unit derived from monomers having an aromatic group and a unit derived from (meth)acrylic acids. The water-soluble acrylic resin having these units can enhance the ink deposition suppressing effect further because it has stronger adsorptivity to carbon black irrespective that it serves as a resin dispersant or not. Examples of the monomer having an aromatic group include benzyl (meth)acrylate, styrene and α-methylstyrene. These monomers may be used either singly or in combination of two or more.

It is particularly preferred that the ink that satisfies either one of the requirement (1) or (2) satisfies the following conditions. The water-soluble acrylic resin has preferably a weight-average molecular weight of 5,000 or more to 10,000 or less. The content (% by mass) of the water-soluble acrylic resin in the ink is preferably 0.5% by mass or more to 2.5% by mass or less based on the total mass of the ink. The content (% by mass) of the water-soluble acrylic resin in the ink relative to the content (% by mass) of the pigment is more preferably 0.1 time or more. When the mass ratio is less than 0.1, the adsorbed amount of the water-soluble acrylic resin to the pigment becomes too small and the ink deposition suppression effect may slightly decrease. The mass ratio is preferably 5.0 or less.

Whether the resin is water-soluble or not can be determined by the method shown below. First, a liquid (resin solid content: 10% by mass) containing a resin neutralized with an alkali (sodium hydroxide, potassium hydroxide, or the like) in an amount equivalent to the acid value is prepared. Then, the liquid thus prepared is diluted with pure water to 10 times (volume basis) to prepare a sample solution. When particles having a particle size are not found as a result of measurement of the particle size of the resin in the sample solution by a dynamic light scattering method, the resin can be determined as water soluble. In the above case, measurement is performed, for example, under the following conditions. As a particle size distribution analyzer, a dynamic light scattering-system particle size distribution analyzer (for example, trade name: "UPA-EX150", product of NIKKISO) can be used.

[Measurement Conditions]
SetZero: 30 seconds
Number of times of measurement: 3 times
Measurement time: 180 seconds Physical property values of the water-soluble acrylic resin such as composition, weight-average molecular weight and acid value can be determined by a conventionally known method. More specifically, the physical property values of the water-soluble acrylic resin can be determined by analyzing a precipitate and a supernatant obtained by centrifugation of the ink. Although the water-soluble acrylic resin can be analyzed even in ink form, it is preferred to analyze the water-soluble acrylic resin extracted from the ink to increase the measurement accuracy. More specifically, it is preferred to add an excess acid (hydrochloric acid or the like) to a supernatant obtained by centrifuging the ink at 75,000 rpm, dry the resin thus precipitated, and analyze the resin.

By analyzing the resin separated from the ink by using high-temperature gas chromatography/mass spectrometer (high-temperature GC/MS), kinds of the units constituting the water-soluble acrylic resin can be confirmed. The molecular weight or kind of the compound constituting each unit can be confirmed by quantitative analysis with nucleic magnetic resonance ($^{13}$C-NMR) or Fourier transform infrared (FT-IR) spectroscopy.

The weight-average molecular weight of the water-soluble acrylic resin can be determined using gel permeation chromatography (GPC). The following are measurement conditions using GPC.

Apparatus: Alliance GPC 2695 (trade name; product of Waters)
Column: four serial columns of Shodex KF-806M (trade name; product of Showa Denko)
Mobile phase: THF (guaranteed)
Flow rate: 1.0 mL/min
Temperature of Oven: 40.0° C.
Amount of sample solution injected: 0.1 mL
Detector: RI (reflective index)
Polystyrene standard samples: PS-1 and PS2 (product of Polymer Laboratories) (17 samples having a molecular weight of 7,500,000, 2,560,000, 841,700, 377,400, 320,000, 210,500, 148,000, 96,000, 59,500, 50,400, 28,500, 20,650, 10,850, 5,460, 2,930, 1,300 and 580)

The acid value of the water-soluble acrylic resin can be measured by a titration method. In Examples described below, the acid value of the water-soluble acrylic resin was measured by dissolving the water-soluble acrylic resin in tetrahydrofuran (THF) and carrying out potentiometric titration with a potassium hydroxide ethanol titrant by using an automatic potentiometric titrator. As the automatic potentiometric titrator, for example, "AT510" (trade name; product of Kyoto Electronics Manufacturing) can be used.

[Water-Soluble Urethane Resin]

The ink to be used in the ink jet recording method of the present invention preferably contains a water-soluble urethane resin. By using an ink containing a water-soluble urethane resin, a more flat pigment layer is formed due to improvement in wettability between ink dots. This facilitates suppression of irregular reflection of light incident on an image so that the image thus recorded is improved further in color developability. Whether the resin is water soluble or not can be determined by a method similar to that used for the above-described water-soluble acrylic resin. The weight-average molecular weight and acid value of the resin can also be measured by a method similar to that used for the above-described water-soluble acrylic resin. The content (% by mass) of the water-soluble urethane resin in the ink is preferably 0.5% by mass or more to 3.0% by mass or less based on the total mass of the ink.

[Aqueous Medium]

The ink to be used in the ink jet recording method of the present invention is an aqueous ink containing at least water as an aqueous medium. As water, deionized water (ion exchanged water) is preferred. The water content (% by mass) in the ink is preferably 10.0% by mass or more to 90.0% by mass or less, more preferably 50.0% by mass or more to 90.0% by mass or less, each based on the total mass of the ink.

The aqueous medium may further contain a water-soluble organic solvent. As the water-soluble organic solvent, usable is a monohydric alcohol, a polyhydric alcohol, a (poly) alkylene glycol, a glycol ether, a nitrogen-containing polar solvent, a sulfur-containing polar solvent or the like. The content (% by mass) of the water-soluble organic solvent in the ink is preferably 3.0% by mass or more to 50.0% by mass or less based on the total mass of the ink.

[Other Additives]

In addition to the above-described components, the ink may contain a water-soluble organic compound which is a solid at normal temperature, for example, a polyhydric alcohol such as trimethylolpropane or trimethylolethane or urea or a derivative thereof such as ethylene urea. The ink may further contain various additives if necessary such as surfactants, pH adjusters, rust inhibitors, antiseptics, fungicides, antioxidants, anti-reduction agents, evaporation accelerators, chelating agents and other water-soluble resins.

EXAMPLES

The present invention will hereinafter be described in further detail with reference to Examples, Comparative Examples and Reference Examples. The present invention is not limited by the following Examples insofar as it departs from the scope of the invention. The amount of the component with "part" or "parts" or "%" will be based on mass unless otherwise particularly noted. The weight-average molecular weight of the resin is a value expressed in terms of polystyrene measured by gel permeation chromatography under the above-described conditions.

<Synthesis of Water-Soluble Acrylic Resin>

A four-necked flask equipped with a reflux tube, a dropping funnel, a thermometer and a stirrer was provided. After the flask was purged with nitrogen, 100 parts of tetrahydrofuran, the kind and amount of monomers shown in Table 1, and 0.16 part of a polymerization initiator (azobisisobutyronitrile) were poured in the flask. The resulting mixture was heated to 70° C. while stirring and was reacted. An aqueous potassium hydroxide solution was added in an amount to give a neutralization percentage of an anionic group of 80% in mole base. Further, an appropriate amount of water was added, followed by stirring. After removal of tetrahydrofuran at a reduced pressure, an appropriate amount of ion exchanged water was added to obtain a liquid containing an acrylic resin having a weight average molecular weight of 8,000 and having a resin content (solid content) of 20.0%. The acid value of the acrylic resin measured by potentiometric titration with a potassium hydroxide methanol titrant is shown in Table 1. The particle size was measured using a dynamic light scattering-system particle size distribution analyzer (trade name "UPA-EX150", product of NIKKISO). It was however confirmed that any liquid did not have particles having a particle size, suggesting that the acrylic resins thus obtained were each a water-soluble acrylic resin. Details of each of the components in Table 1 are shown below.

St: styrene
αMSt: α-methylstyrene
BzA: benzyl acrylate
BzMA: benzyl methacrylate
nBA: n-butyl acrylate
AA: acrylic acid
MAA: methacrylic acid

TABLE 1

Synthesis conditions and properties of water-soluble acrylic resins

| Acrylic resin | Monomer 1 | | Monomer 2 | | Monomer 3 | | Acid value (mgKOH/g) |
|---|---|---|---|---|---|---|---|
| | Kind | Amount | Kind | Amount | Kind | Amount | |
| 1 | St | 16.7 | AA | 3.0 | | | 120 |
| 2 | St | 16.7 | MAA | 3.7 | | | 120 |
| 3 | St | 14.6 | AA | 3.1 | nBA | 2.6 | 120 |
| 4 | BzA | 26.0 | AA | 4.7 | | | 120 |
| 5 | BzA | 26.0 | MAA | 5.9 | | | 120 |
| 6 | BzMA | 28.2 | AA | 5.1 | | | 120 |
| 7 | BzMA | 28.2 | MAA | 6.4 | | | 120 |
| 8 | αMSt | 18.9 | AA | 3.5 | | | 120 |
| 9 | αMSt | 18.9 | MAA | 4.3 | | | 120 |
| 10 | St | 16.7 | AA | 4.0 | | | 150 |
| 11 | St | 16.7 | AA | 2.5 | | | 100 |
| 12 | St | 16.7 | AA | 3.5 | | | 135 |
| 13 | nBA | 20.5 | AA | 3.7 | | | 120 |
| 14 | St | 16.7 | AA | 3.5 | | | 136 |

<Synthesis of Acrylic Resin Particles>

In a four-necked flask equipped with a stirrer, a reflux condenser and a nitrogen gas inlet tube, 60.0 parts of a liquid containing Acrylic resin 1 was poured. Then, a nitrogen gas was introduced and the resulting mixture was stirred and heated to 80° C. After addition of 8.0 parts of a mixture of styrene and methyl methacrylate (4:1 (mass ratio)) and 32.0 parts of water, a liquid obtained by dissolving 1.0 part of potassium persulfate (polymerization initiator) in 16.7 parts of water was added dropwise for 3 hours. After aging for 2 hours, an appropriate amount of ion exchanged water was added to obtain a liquid containing acrylic resin particles having a core-shell structure and having a resin content (solid content) of 20.0%. The particle size of the liquid was measured using a dynamic light scattering-system particle size distribution analyzer (trade name "UPA-EX150", product of NIKKISO). As a result, presence of particles having a particle size was confirmed, suggesting that the resulting acrylic resin particles were not a water-soluble acrylic resin.

<Synthesis of Urethane Resin>

A four-necked flask equipped with a thermometer, a stirrer, a nitrogen inlet tube and a reflux tube was provided. The flask was charged with 31.2 parts of isophorone diisocyanate, 35.9 parts of polypropylene glycol (number average molecular weight: 2000), and 12.7 parts by dimethylolpropionic acid. The flask was charged further with 0.02 part of dibutyltin dilaurate, 0.2 part of ethylenediamine, 3.0 parts of methanol and 120 parts of methyl ethyl ketone. The resulting mixture was reacted at 80° C. for 6 hours in a nitrogen gas atmosphere. After cooling to 40° C., ion exchanged water was added. An aqueous potassium hydroxide solution was added while stirring at a high speed with a homomixer. The methyl ethyl ketone was distilled off by heating and reducing the pressure to obtain a liquid containing a urethane resin having a weight average molecular weight of 15,000 and having a resin content (solid content) of 20.0%. The acid value of the urethane resin measured using potentiometric titration with a potassium hydroxide methanol titrant was 65 mgKOH/g. The particle size was measured using a dynamic light scattering-system particle size distribution analyzer (trade name: "UPA-EX150", product of NIKKISO), but particles having a particle size were not confirmed, suggesting that the urethane resin thus obtained was a water-soluble urethane resin.

<Preparation of Pigment Dispersion Liquids>
(Pigment Dispersion Liquids 1 to 22)

A mixture was obtained by mixing 10.0 parts of a pigment (carbon black), the liquid containing acrylic resin, and pure water. The mixture thus obtained was stirred using a homo-mixer to preliminary disperse the pigment for 60 minutes. Then, main dispersion was performed at 25° C. by using a beads mill filled with zirconia beads having a diameter of 0.3 mm. After removal of the beads, centrifugal separation treatment was performed to remove coarse particles. The residue was then pressure filtered through Micro Filter (product of Fujifilm) having a pore size of 3.0 μm. An appropriate amount of pure water was added to adjust the concentration of the resulting mixture to obtain each pigment dispersion liquid. Table 2 shows the BET specific surface area of the pigment used for the preparation of the pigment dispersion liquid, kind of the acrylic resin, amount of the liquid containing acrylic resin, amount of the pure water, the time of the main dispersion, and the properties of the pigment dispersion liquid.

(Pigment Dispersion Liquid 23)

A solution obtained by dissolving 5 g of concentrated hydrochloric acid in 5.5 g of water was cooled to 5° C. and under that state, 1.5 g of 4-amino-1,2-benzenedicarboxylic acid was added. A container containing the resulting mixture was placed in an ice bath. While keeping the temperature of the solution at 10° C. or less by stirring, a solution obtained by dissolving 1.8 g of sodium nitrite in 9 g of water of 5° C. was added. After stirring for 15 minutes, 6 g of carbon black (BET specific surface area: 160 m$^2$/g) was added under stirring. Stirring was continued for further 15 minutes to obtain a slurry. The slurry thus obtained was filtered through a filter paper (trade name; "Standard Filter Paper No. 2", product of Advantec). The particles thus obtained were washed sufficiently with water and dried in an oven of 110° C. to obtain a self-dispersible pigment. An appropriate amount of ion exchanged water was added to obtain Pigment Dispersion liquid 23 having a pigment content of 10.0%. The properties of the pigment dispersion liquid are shown in Table 2.

TABLE 2

Preparation conditions and properties of pigment dispersion liquids

| | Preparation conditions | | | | | Properties | |
|---|---|---|---|---|---|---|---|
| | | | Amount of | | | | |
| Pigment dispersion liquids | BET specific surface area of pigment (m$^2$/g) | No. of acrylic resin | liquid containing acrylic resin (part) | Amount of pure water (part) | Main dispersion (time) | Pigment content P (%) | Acrylic resin content A (%) |
| 1 | 160 | 1 | 15.0 | 75.0 | 7 | 10.0 | 3.0 |
| 2 | 160 | 2 | 15.0 | 75.0 | 7 | 10.0 | 3.0 |
| 3 | 160 | 3 | 15.0 | 75.0 | 7 | 10.0 | 3.0 |
| 4 | 160 | 4 | 15.0 | 75.0 | 7 | 10.0 | 3.0 |
| 5 | 160 | 5 | 15.0 | 75.0 | 7 | 10.0 | 3.0 |
| 6 | 160 | 6 | 15.0 | 75.0 | 7 | 10.0 | 3.0 |
| 7 | 160 | 7 | 15.0 | 75.0 | 7 | 10.0 | 3.0 |
| 8 | 160 | 8 | 15.0 | 75.0 | 7 | 10.0 | 3.0 |
| 9 | 160 | 9 | 15.0 | 75.0 | 7 | 10.0 | 3.0 |
| 10 | 160 | 10 | 15.0 | 75.0 | 7 | 10.0 | 3.0 |
| 11 | 160 | 11 | 15.0 | 75.0 | 7 | 10.0 | 3.0 |
| 12 | 160 | 12 | 15.0 | 75.0 | 7 | 10.0 | 3.0 |
| 13 | 160 | 1 | 15.0 | 75.0 | 10 | 10.0 | 3.0 |
| 14 | 160 | 1 | 15.0 | 75.0 | 4 | 10.0 | 3.0 |
| 15 | 210 | 1 | 15.0 | 75.0 | 7 | 10.0 | 3.0 |
| 16 | 211 | 1 | 15.0 | 75.0 | 7 | 10.0 | 3.0 |
| 17 | 160 | 13 | 15.0 | 75.0 | 7 | 10.0 | 3.0 |
| 18 | 160 | 1 | 4.5 | 85.5 | 7 | 10.0 | 0.9 |
| 19 | 160 | 1 | 5.0 | 85.0 | 7 | 10.0 | 1.0 |
| 20 | 211 | 13 | 4.5 | 75.0 | 7 | 10.0 | 0.9 |
| 21 | 160 | 14 | 15.0 | 75.0 | 7 | 10.0 | 3.0 |
| 22 | 160 | 1 | 15.0 | 75.0 | 3 | 10.0 | 3.0 |
| 23 | 160 | — | — | — | — | 10.0 | 0.0 |

<Preparation of Ink>

Components (unit: %) shown in the upper part of Table 3 were mixed and stirred sufficiently. The resulting mixture was pressure filtered through Micro Filter (product of Fujifilm) having a pore size of 3.0 μm to prepare each ink. In Table 3, "Acetylenol E100" is the trade name of a nonionic surfactant (acetylene glycol-ethylene oxide adduct) which is a product of Kawaken Fine Chemicals. In Table 3, the particle size at 50% in the cumulative volume-based particle size distribution, that is, D50 of the pigment in each ink was measured using a dynamic light scattering-system particle size analyzer (trade name: "UPA-EX150, product of NIK-KISO).

TABLE 3

Composition and properties of inks

| | Inks | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| No. of pigment dispersion liquid | 1 | 2 | 3 | 4 | 5 | 6 | 7 | 8 | 9 | 10 | 1 | 11 | 12 | 13 |
| Pigment dispersion liquid | 50.0 | 50.0 | 50.0 | 50.0 | 50.0 | 50.0 | 50.0 | 50.0 | 50.0 | 50.0 | 50.0 | 50.0 | 50.0 | 50.0 |
| Liquid containing acrylic resin 1 | | | | | | | | | | 7.5 | 5.0 | | | |
| Liquid containing acrylic resin 3 | | | | | | | | | | | | | | |
| Liquid containing acrylic resin particle | | | | | | | | | | | | | | |
| Liquid containing urethane resin | 5.0 | 5.0 | 5.0 | 5.0 | 5.0 | 5.0 | 5.0 | 5.0 | 5.0 | 5.0 | 5.0 | 5.0 | 5.0 | 5.0 |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 | 5.0 |
| Triethylene glycol | 5.0 | 5.0 | 5.0 | 5.0 | 5.0 | 5.0 | 5.0 | 5.0 | 5.0 | 5.0 | 5.0 | 5.0 | 5.0 | 5.0 |
| 1,2-Hexanediol | 3.0 | 3.0 | 3.0 | 3.0 | 3.0 | 3.0 | 3.0 | 3.0 | 3.0 | 3.0 | 3.0 | 3.0 | 3.0 | 3.0 |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 | 0.5 |
| Ion exchanged water | 21.5 | 21.5 | 21.5 | 21.5 | 21.5 | 21.5 | 21.5 | 21.5 | 21.5 | 14.0 | 16.5 | 21.5 | 21.5 | 21.5 |
| Pigment content P (%) | 5.0 | 5.0 | 5.0 | 5.0 | 5.0 | 5.0 | 5.0 | 5.0 | 5.0 | 5.0 | 5.0 | 5.0 | 5.0 | 5.0 |
| Acrylic resin* content A (%) | 1.5 | 1.5 | 1.5 | 1.5 | 1.5 | 1.5 | 1.5 | 1.5 | 1.5 | 1.5 | 2.5 | 1.5 | 1.5 | 1.5 |
| A/P ratio (time) | 0.3 | 0.3 | 0.3 | 0.3 | 0.3 | 0.3 | 0.3 | 0.3 | 0.3 | 0.3 | 0.5 | 0.3 | 0.3 | 0.3 |
| $D_{50}$ (nm) of Pigment | 60 | 60 | 60 | 60 | 60 | 60 | 60 | 60 | 60 | 60 | 60 | 60 | 60 | 40 |

| | Inks | | | | | | | | | | | | |
|---|---|---|---|---|---|---|---|---|---|---|---|---|---|
| | 15 | 16 | 17 | 18 | 19 | 20 | 21 | 22 | 23 | 24 | 25 | 26 | 27 |
| No. of pigment dispersion liquid | 14 | 15 | 16 | 17 | 18 | 19 | 1 | 1 | 20 | 10 | 21 | 22 | 23 |
| Pigment dispersion liquid | 50.0 | 50.0 | 50.0 | 50.0 | 50.0 | 50.0 | 50.0 | 50.0 | 50.0 | 50.0 | 50.0 | 50.0 | 50.0 |
| Liquid containing acrylic resin 1 | | | | | | | 17.5 | | | | | | 7.5 |
| Liquid containing acrylic resin 3 | | | | | 5.3 | 5.0 | | | | | | | |
| Liquid containing acrylic resin particle | | | | | | | | | | 7.5 | | | |
| Liquid containing urethane resin | 5.0 | 5.0 | 5.0 | 5.0 | 5.0 | 5.0 | 5.0 | | | 5.0 | 5.0 | 5.0 | 5.0 |
| Glycerin | 10.0 | 10.0 | 10.0 | 10.0 | 10.0 | 10.0 | 10.0 | 10.0 | 10.0 | 10.0 | 10.0 | 10.0 | 10.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 |
| Triethylene glycol | 5.0 | 5.0 | 5.0 | 5.0 | 5.0 | 5.0 | 5.0 | 5.0 | 5.0 | 5.0 | 5.0 | 5.0 | 5.0 |
| 1,2-Hexanediol | 3.0 | 3.0 | 3.0 | 3.0 | 5.0 | 3.0 | 3.0 | 3.0 | 3.0 | 3.0 | 3.0 | 3.0 | 3.0 |
| Acetylenol E100 | 0.5 | 0.5 | 0.5 | 0.5 | 0.0 | 0.5 | 0.5 | 0.5 | 0.5 | 0.5 | 0.5 | 0.5 | 0.5 |
| Ion exchanged water | 21.5 | 21.5 | 21.5 | 21.5 | 14.7 | 16.5 | 4.0 | 26.5 | 26.5 | 14.0 | 21.5 | 21.5 | 14.0 |
| Pigment content P (%) | 5.0 | 5.0 | 5.0 | 5.0 | 5.0 | 5.0 | 5.0 | 5.0 | 5.0 | 5.0 | 5.0 | 5.0 | 5.0 |
| Acrylic resin* content A (%) | 1.5 | 1.5 | 1.5 | 1.5 | 0.45 | 0.50 | 5.0 | 1.5 | 0.45 | 0.0 | 0.0 | 1.5 | 1.5 |
| A/P ratio (time) | 0.3 | 0.3 | 0.3 | 0.3 | 0.09 | 0.10 | 1.0 | 0.3 | 0.09 | 0.0 | 0.0 | 0.3 | 0.3 |
| $D_{50}$ (nm) of Pigment | 80 | 60 | 60 | 60 | 60 | 60 | 60 | 60 | 60 | 60 | 60 | 81 | 60 |

*water-soluble acrylic resin having an acid value of 135 mgKOH/g or less

<Evaluation>

Each of the inks thus prepared was evaluated as follows. For the evaluation, an ink jet recording apparatus (trade name: "iPF8400SE", product of Canon) that ejects an ink from its recording head by the action of thermal energy was used. In the present Examples, the recording duty of a solid image is defined as 100% when it is recorded under the following conditions: the mass of ink droplets ejected from one of ejection orifices is 4.5 ng±5% and four ink droplets are applied to a 1/600 inch×1/600 inch unit region. In this recording apparatus, an ink heated to 40° C. is preliminarily ejected to an ink receiving member before and after recording an image. The amount of the heated ink to be preliminarily ejected to the ink receiving member is 16 ink droplets per ejection orifice. In Comparative Example 1 and Reference Examples 1 and 2, however, the ink was not heated at the time of preliminary ejection. In the present invention, in the evaluation criteria of each of the following evaluation items, "A" and "B" mean an acceptable level and "C" means an unacceptable level. The evaluation results are shown in Table 4.

(Color Developability)

The above-described ink jet recording apparatus was used and a 3 cm×3 cm solid image having a recording duty of 100% was recorded on glossy paper (trade name: "Premium glossy paper 2", product of Canon). One day after recording, SCE (specular component excluded) mode lightness L* of the solid image was measured using a spectrophotometer (trade name: "CM-2600d", product of Konica Minolta) and color developability of the image was evaluated based on the evaluation criteria shown below. When the value of L* is small, the density as black is high, meaning that the image thus obtained is excellent in color developability.

A: The value L* was less than 8.0.
B: The value L* was 8.0 or more to less than 10.0.
C: The value L* was 10.0 or more (Ink Deposition)

The above-described ink jet recording apparatus was placed under the environment of a temperature of 30° C. and a relative humidity of 10%. A cycle of recording a nozzle check pattern on a sheet of paper per minute was repeated 70 times. At that time, an ink heated to 40° C. was preliminarily ejected to an ink receiving member once per cycle. The amount of the ink preliminarily ejected to the ink receiving member was 16 ink droplets per ejection orifice. In Comparative Example 1 and Reference Examples 1 and 2, however, the ink was not heated at the time of preliminary ejection. After completion of 70-times repetition of the above-described cycle, the ink deposition in the ink receiving member was observed and the nozzle check pattern recorded at the 70th cycle was visually checked. The ink deposition was evaluated based on the following evaluation criteria.

A: No ink deposition is found in the ink receiving member and in addition, neither ejection failure nor deflection is found from the nozzle check pattern.

B: Slight ink deposition is found in the ink receiving member but neither ejection failure nor deflection is found in the nozzle check pattern.

C: Ink deposition is found on the ink receiving member and in addition, ejection failure or deflection is found in the nozzle check pattern.

TABLE 4

Evaluation condition and Evaluation results

| | | | Evaluation condition | | Evaluation results | |
|---|---|---|---|---|---|---|
| | | Ink | Heating step | Color developability | | Ink deposition |
| Examples | 1 | 1 | With | A | | A |
| | 2 | 2 | With | A | | A |
| | 3 | 3 | With | A | | A |
| | 4 | 4 | With | A | | A |
| | 5 | 5 | With | A | | A |
| | 6 | 6 | With | A | | A |
| | 7 | 7 | With | A | | A |
| | 8 | 8 | With | A | | A |
| | 9 | 9 | With | A | | A |
| | 10 | 10 | With | A | | A |
| | 11 | 11 | With | A | | A |
| | 12 | 12 | With | A | | A |
| | 13 | 13 | With | A | | A |
| | 14 | 14 | With | A | | A |
| | 15 | 15 | With | A | | A |
| | 16 | 16 | With | A | | A |
| | 17 | 17 | With | A | | B |
| | 18 | 18 | With | A | | B |
| | 19 | 19 | With | A | | B |
| | 20 | 20 | With | A | | A |
| | 21 | 21 | With | A | | A |
| | 22 | 22 | With | B | | A |
| | 23 | 23 | With | B | | B |
| Comparative Examples | 1 | 1 | Without | A | | C |
| | 2 | 24 | With | C | | C |
| | 3 | 25 | With | A | | C |
| | 4 | 26 | With | C | | A |
| Reference Examples | 1 | 25 | Without | A | | C |
| | 2 | 26 | Without | C | | A |
| | 3 | 27 | With | B | | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-045716, filed Mar. 10, 2017, which is hereby incorporated by reference herein in its entirety.

What is claimed is:

1. An ink jet recording method comprising:
a recording step of ejecting an aqueous ink from an ejection orifice of a recording head, based on image data, to thereby record an image on a recording medium; and
a preliminary ejection step of heating the aqueous ink and ejecting the heated aqueous ink to an ink receiving member from the ejection orifice based on preliminary ejection data;
wherein the aqueous ink comprises a pigment and a resin dispersant for dispersing the pigment and satisfies at least one of the following requirements (1) and (2):
Requirement (1): the resin dispersant is a water-soluble acrylic resin having an acid value of 135 mgKOH/g or less;
Requirement (2): the aqueous ink further comprises a water-soluble acrylic resin having an acid value of 135 mgKOH/g or less, and
wherein the pigment is carbon black whose cumulative 50% particle diameter in a volume-based particle size distribution is 80 nm or less.

2. The ink jet recording method according to claim 1, wherein the pigment has a BET specific surface area of 210 $m^2/g$ or less.

3. The ink jet recording method according to claim 1, wherein the water-soluble acrylic resin has (i) a unit derived from a monomer having an aromatic group and (ii) a unit derived from a (meth)acrylic acid.

4. The ink jet recording method according to claim 1, wherein the content (% by mass) of the water-soluble acrylic resin in the ink relative to the content (% by mass) of the pigment is 0.1 times or more in terms of mass ratio.

5. The ink jet recording method according to claim 1, wherein the aqueous ink further comprises a water-soluble urethane resin.

6. An ink jet recording apparatus comprising:
an aqueous ink;
a recording head filled with the aqueous ink and ejecting the aqueous ink from an ejection orifice, based on image data, to thereby record an image on a recording medium; and
a preliminary ejection mechanism that heats the aqueous ink and ejects the heated aqueous ink to an ink receiving member from the ejection orifice based on preliminary ejection data,
wherein the aqueous ink comprises a pigment and a resin dispersant for dispersing the pigment and satisfies at least one of the following requirements (1) and (2):
Requirement (1): the resin dispersant is a water-soluble acrylic resin having an acid value of 135 mgKOH/g or less;
Requirement (2): the aqueous ink further comprises a water-soluble acrylic resin having an acid value of 135 mgKOH/g or less, and
wherein the pigment is carbon black whose cumulative 50% particle diameter in a volume-based particle size distribution is 80 nm or less.

7. The ink jet recording method according to claim 1, wherein the aqueous ink satisfies the requirement (1).

8. The ink jet recording method according to claim 1, wherein the pigment has a cumulative 50% particle diameter in a volume-based particle size distribution of 55 nm or more.

9. The ink jet recording method according to claim 2, wherein the pigment has a BET specific surface area of 100 $m^2/g$ or more.

10. The ink jet recording method according to claim 2, wherein the pigment has a BET specific surface area of 150 $m^2/g$ or more.

11. The ink jet recording method according to claim 2, wherein the pigment has a BET specific surface area of 155 $m^2/g$ or more.

12. The ink jet recording method according to claim 1, wherein the content (% by mass) of the pigment in the ink is 1.0% by mass or more to 10.0% by mass or less based on the total mass of the ink.

13. The ink jet recording method according to claim 1, wherein the acid value of the water-soluble acrylic resin is 80 mgKOH/g or more.

14. The ink jet recording method according to claim 1, wherein the acid value of the water-soluble acrylic resin is 100 mgKOH/g or more.

15. The ink jet recording method according to claim 1, wherein the water-soluble acrylic resin has a weight-average molecular weight of 5,000 or more to 10,000 or less.

16. The ink jet recording method according to claim 1, wherein the content (% by mass) of the water-soluble acrylic resin in the ink is 0.5% by mass or more to 2.5% by mass or less based on the total mass of the ink.

17. The ink jet recording method according to claim 1, wherein the content (% by mass) of the water-soluble acrylic resin in the ink relative to the content (% by mass) of the pigment is 5.0 times or less in terms of mass ratio.

18. The ink jet recording method according to claim 1, wherein heating the aqueous ink in the preliminary ejection step is controlled so as to adjust the temperature of the aqueous ink ejected based on preliminary ejection data to 40° C. or more to 70° C. or less.

19. The ink jet recording method according to claim 1, wherein heating the aqueous ink in the preliminary ejection step is performed by applying a current to a heater for ink ejection that is small enough not to eject the aqueous ink and to thereby control the temperature of the recording head.

* * * * *